April 14, 1942.      B. H. BROWALL      2,279,653
OPERATING MECHANISM FOR DOUBLE-ACTING AUTOMATIC BRAKE SLACK ADJUSTERS
Filed April 19, 1940      2 Sheets-Sheet 1

Inventor
B. H. Browall
By E. F. Wenderoth
Atty.

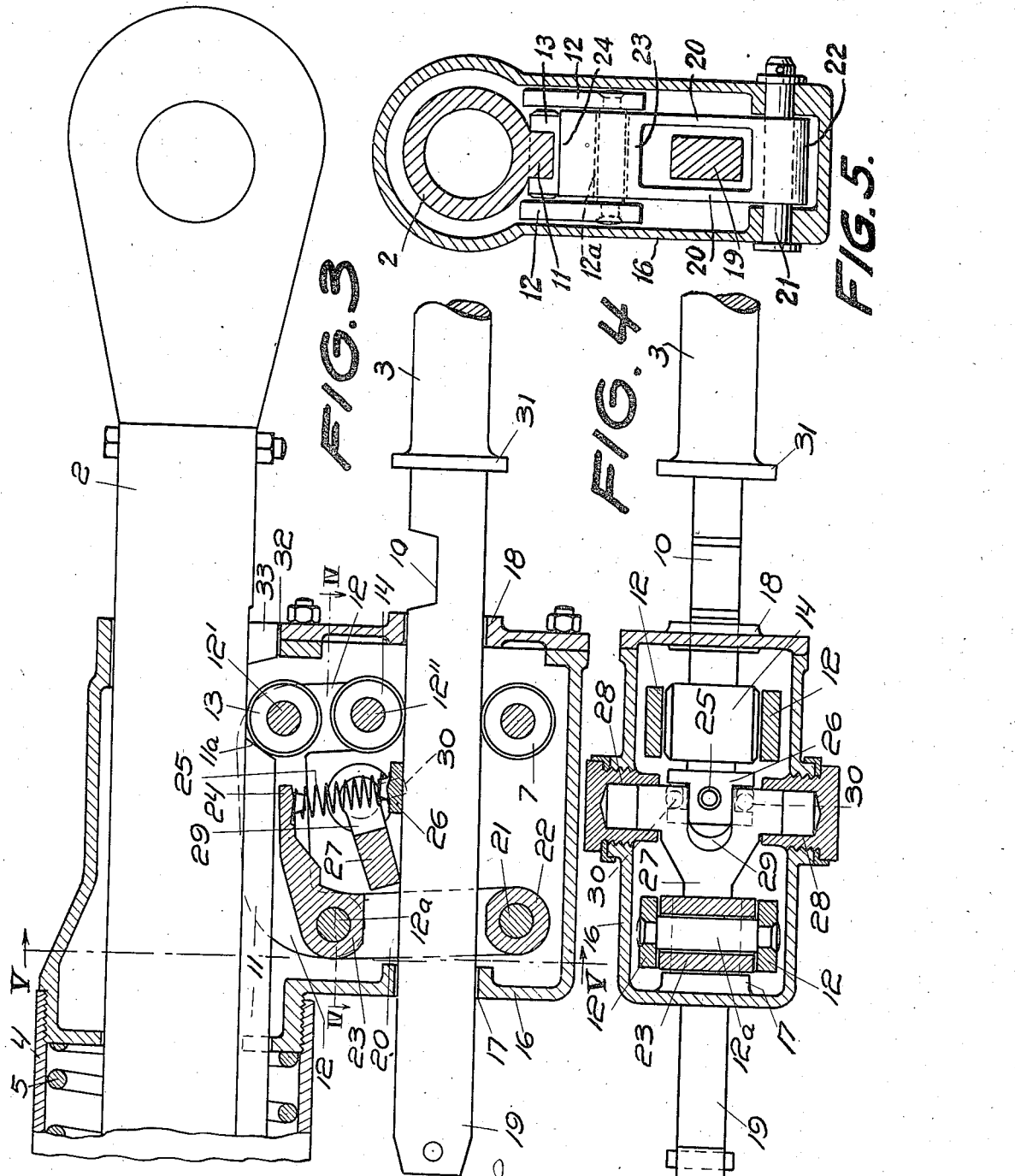

Patented Apr. 14, 1942

2,279,653

UNITED STATES PATENT OFFICE 2,279,653

OPERATING MECHANISM FOR DOUBLE-ACTING AUTOMATIC BRAKE SLACK ADJUSTERS

Bert Henry Browall, Malmo, Sweden, assignor to Svenska Aktiebolaget Bromsregulator, Malmo, Sweden, a corporation of Sweden Application April 19, 1940, Serial No. 330,619
In Germany April 19, 1939

4 Claims. (Cl. 188—198)

This invention relates to slack adjusters for brakes and more particularly to double-acting automatic slack adjusters of the type comprising a brake rod and a member axially slidable on said brake rod in both directions and adapted to be moved in relation to said brake rod in one direction at application and in the other direction at release of the brake. In automatic slack adjusters of this type, disclosed in the U. S. Patent No. 2,035,228 to Gallusser and in my U. S. Patent No. 2,225,001, granted December 17, 1940, and defined as double-acting for the reason that they are capable not only of reducing the slack when too large but also of increasing the slack when too small, the said axially slidable member on the brake rod performs the double function of coacting with a relatively movable part of the brake rod for moving said part in the slack reducing direction in relation to the main part of the brake rod at release of the brake, and of controlling a brake power transmitting coupling between the two relatively movable brake rod parts for limiting their relative movement in the slack increasing direction at application of the brake. For operating the slidable member on the brake rod several constructions of operating mechanism have been proposed. In some of the proposed constructions the slidable member is acted upon by a compressed spring against the action of which the slidable member on the brake rod is moved in one direction by an operating rod at application of the brake. In the known construction of this kind, in which the said spring moves the slidable member on the brake rod back into normal position at release of the brake, the operation of the brake is materially disturbed by the said spring because of the fact that the brake power is counteracted by the power of the said spring and that this must be rather strong, namely strong enough for overcoming, without yielding, the resistance against movement of the brake rigging, even if the latter should be heavy to move. In other proposed constructions of the operating mechanism use is made of a rotatable operating guide plate for effecting the movement of the slidable member on the brake rod in both directions. Constructions of this kind are very bulky, and further they cannot easily be made such as to render the slack adjuster selflocking against unintentional slack increasing movement due to shocks or the like, for instance when switching the cars, at released brake.

The chief object of the present invention is to provide an operating mechanism for slack adjusters of the type set forth, which is of a simple and neat construction and which is reliable in its action. A further object of the invention is to make possible the use of a relatively weak spring for the slidable member on the brake rod. A still further object of the invention is to provide an operating mechanism which is easy to make such as to render the slack adjuster self-locking against slack increasing movement at released brake.

With all these and other objects in view which will occur in the course of the following specification the invention consists in the construction, arrangement and combination of parts hereinafter fully set forth and claimed.

The invention is illustrated by way of examples in the accompanying drawings in which:

Fig. 3 is a plan view, partly in section, of parts of an automatic slack adjuster and another form of operating mechanism therefor embodying the invention, the parts being shown in a position corresponding to released brake.

Fig. 4 is a section substantially on the line IV—IV in Fig. 3.

Fig. 5 is a section substantially on the line V—V in Fig. 3.

Figure 1:
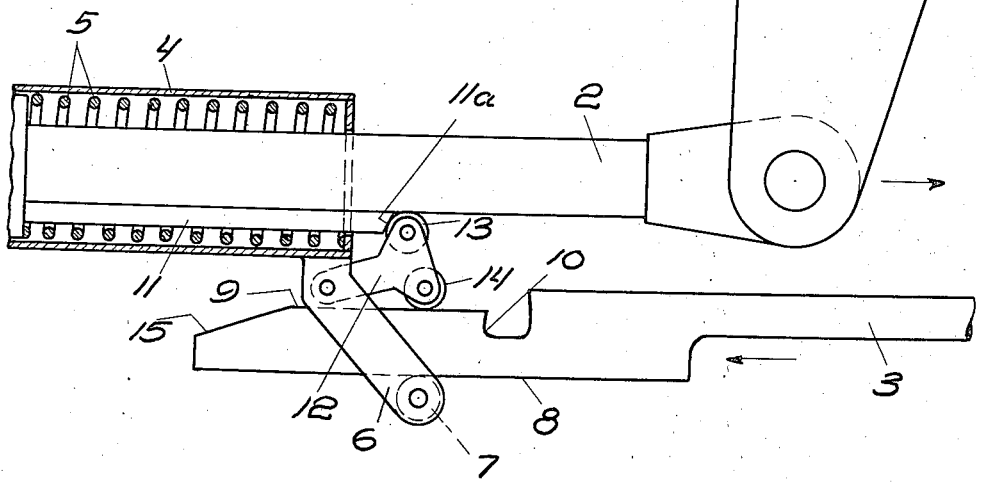
Fig. 1 is a plan view, partly in section, of parts of an automatic slack adjuster and one form of operating mechanism therefor embodying the invention, the parts being shown in a position of the application movement of the brake.

Referring to the drawings, 1 denotes a live brake lever and 2 a brake rod linked to said brake lever at the free end thereof. 3 denotes an operating rod, and this operating rod and the brake rod 2 are relatively movable in one direction at application and in the other direction at release of the brake, the first mentioned direction being indicated by the arrows in Fig. 1. As is well known in the art the operating rod 3 may be connected to the free end of a dead brake lever coupled to the live brake lever, or the operating rod 3 may be connected to a fixed point if there is no dead brake lever coupled to the live brake lever. 4 denotes a member which is slidable on the brake rod 2 and forms part of a double-acting automatic slack adjuster of the type herein referred to. The member 4 is constructed as a casing for a compressed spring 5, against the action of which the member 4 is axially displaced on the brake rod 2 by the operating rod 3 at application of the brake. As is well known in the art the member 4 performs the double function of coacting with a relatively movable part of the brake rod for moving said part in the slack reducing direction in relation to the main part of the brake rod 2 at release of the brake, and of controlling a brake power transmitting coupling between the two relatively movable brake rod parts for limiting their relative movement in the slack increasing direction at application of the brake. Since said relatively movable brake rod part and said coupling and their arrangement and combination with the main part of the brake rod and the slidable member 4 thereon form no part of this invention and are known in several constructional forms, they are not shown and will not be described in detail herein.

Figure 2:
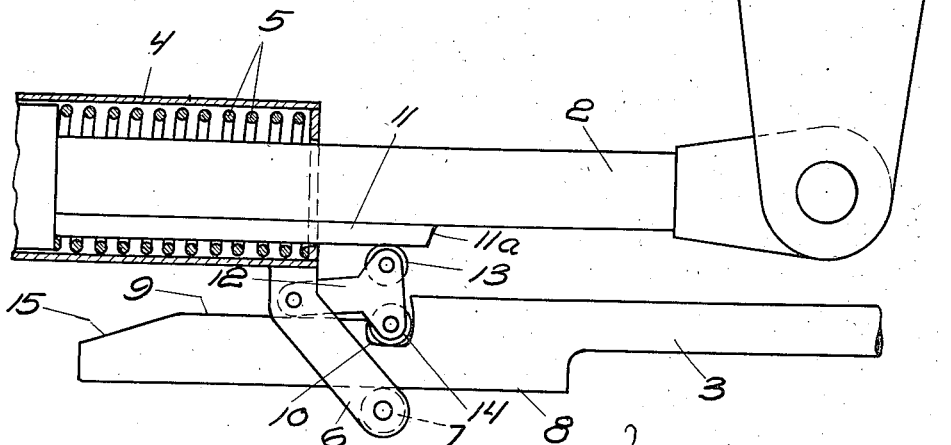
Fig. 2 is a view similar to Fig. 1 but with the parts in a position of the brake application movement beyond the distance corresponding to the normal value of the slack.

In the form of the operating mechanism illustrated in Figs. 1 and 2 the member 4 is provided with a laterally projecting arm 6, and mounted at the free end of this arm 6 is a guiding roller 7 coacting with a guiding surface 8 on the operating rod 3 for guiding the latter at its movement in relation to the brake rod 2. At the side opposite to the guiding surface 8 the operating rod 3 is provided with a guiding surface 9 which, as well as the guiding surface 8, extends in a direction parallel to the direction of movement of the operating rod 3 in relation to the brake rod 2. At its inner end the guiding surface 9 ends in a recess 10 formed in the operating rod 3. On the side facing the operating rod 3 the brake rod 2 is provided with a longitudinally extending ledge 11. A latch 12, preferably T-shaped, is pivoted at the end of its middle leg to the arm 6 on the member 4 and is provided with rollers 13 and 14 at the ends of its other legs. At its free end the operating rod 3 is provided with an oblique surface 15 joining the guiding surface 9 at the outer end thereof. One end of the ledge 11 acts as an abutment for coaction with the roller 13 on the latch 12.

The operation of the operating mechanism now described is as follows. With the latch 12 in the position shown in Fig. 1, which it takes during the normal slack consuming part of the application stroke of the brake, the latch 12 supports itself with its roller 14 against the guiding surface 9 and is thereby held with the roller 13 in engagement with the abutment 11a formed by the end of the ledge 11 on the main brake rod 2. Thus, in this position the latch 12 locks the slidable member 4 to the brake rod 2, so that the member 4 must partake in the movement of the main brake rod 2 in relation to the operating rod 3. When the brake, at application thereof, has travelled a distance corresponding to the normal value of the slack, the roller 14 reaches and enters the recess 10, whereby the roller 13 is no longer held in engagement with the abutment 11a but is allowed to move along the ledge 11 at the continued relative movement of the brake rod 2 and the operating rod 3 as shown in Fig. 2. By the coaction of the roller 13 with the ledge 11 the latch 12 from now is held with the roller 14 engaged in the recess 10, thereby locking the member 4 to the operating rod 3 and thus preventing the member 4 from partaking in the movement of the brake rod 2 in relation to the operating rod 3. At this movement in the brake application direction the member 4 is axially displaced on the brake rod 2 against the action of the compressed spring 5. The member 4 remains locked to the operating rod 3 until during the following release of the brake the roller 13 again reaches the abutment 11a, whereby the roller 14 is no longer held in the recess 10 but is allowed to move out of the recess 10 and along the guiding surface 9.

In slack adjusters of the type herein referred to it is well known that the slack adjuster is locked against slack increasing movement as a result of a movement of the member 4 on the main brake rod 2 against the action of the spring 5 and due to the fact that the hereinbefore mentioned brake stress transmitting coupling between the two relatively movable brake rod parts of the slack adjuster is rendered active by such a movement of the member 4 and, when active, prevents relative movement of the said two brake rod parts in the slack increasing direction. It is also known to render the slack adjuster self-locking against unintentional slack increasing movement at released brake by affording freedom to the member 4 to be moved on the brake rod 2 against the action of the spring 5 by the action of such a stress in the brake rod as may be caused by a jolt or shock, for instance when switching the cars, and would result in a slack increasing movement should the slack adjuster not be able to lock itself thereagainst. In the form of the invention illustrated in Figs. 1 and 2 the requisite freedom of movement of the member for rendering the slack adjuster selflocking against slack increasing movement at released brake is obtained simply due to the inclined surface 15 on the operating rod 3. Towards the end of the brake release movement the roller 14 comes on the inclined surface 15, and due to this, at fully released brake, the latch 12 is no longer held with its roller 13 in engagement with the abutment 11a but is free to move with the roller 13 out of engagement with the abutment 11a and along the ledge 11, thus permitting the member 4 to be moved against the action of the spring 5 by an arising stress in the brake rod. At the cease of a stress causing such a movement of the member 4 against the action of the spring 5 the latter returns the member 4 into normal position, and for this purpose no great strength of the spring 5 is required so that the spring 5 can be made sufficiently weak for not disturbing the braking operation to any appreciable degree.

The form of the invention illustrated in Figs. 1 and 2 is of a remarkably simple construction but does not completely safeguard against unintentional slack increasing movement of the slack adjuster under the action of jolts and shocks at released brake. The fact is that it may happen that the brake, at the release thereof after a braking operation, is prevented, for instance by a hand brake that has not been fully released, from reaching the fully released position and is stopped in a position before the roller 14 has reached the inclined surface 15, so that the latch 12 cannot move with its roller 13 out of engagement with the abutment 11a but will be held in the position in which it locks the member 4 to the brake rod 2 and thus prevents displacement of the member 4 on the brake rod 2 against the action of the spring 5. In such a case the slack adjuster is unable to lock itself against unintentional slack increasing movement due to shocks and the like.

The form of the invention illustrated in Figs. 3 and 4 is constructed with a view to enable the slack adjuster to lock itself against slack increasing movement at released brake irrespective of the position in which the release movement of the brake might have been stopped. The form of Figs. 3 and 4 is constructed also with a view to provide an enclosing casing for the parts operatively connecting the slidable member 4 to the operating rod 3. In the form of Figs. 3 and 4 the arm 6 in the form of Figs. 1 and 2 is substituted by a casing 16 which is fixed to the member 4 and surrounds both the brake rod 2 and the end portion 19 of the operating rod 3. The said end portion 19 extends through and is guided in two openings 17 and 18 in the casing 16. As in the form of Figs. 1 and 2 a recess 10 is provided in the operating rod 3, namely in the end portion 19. The latter supports itself laterally against the roller 7 which is journalled in the casing 16. The latch 12 carrying the rollers 13 and 14 is not pivoted directly to the casing 16 but to the free end of a swingable arm 20 journalled on a shaft 21 in the casing 16. The arm 20 comprises two parallel legs united at both ends by two journals 22 and 23 receiving the shaft 21 and the pivot pin 12a of the latch 12, respectively. The journal 23 at the free end of the arm 20 is provided with a projection 24, and a spring 25 supports itself at one end against the free end of this projection 24 and at the other end against a shoe 26 which slidably supports itself against one side of the end portion 19 of the operating rod 3. The spring 25 presses the shoe 26 against the operating rod portion 19 and tends to rotate the arm 20 in the anticlockwise direction as viewed in Fig. 3. The latch 12 comprises two parallel legs interconnected by means of the pivot pin 12a and shafts 12' and 12" for the rollers 13 and 14. An abutment arm 27 is pivoted in two opposing journal cups 28 screwed into the casing 16. The abutment arm 27 is provided with a recess 29 for the spring 25 and with two pins 30 engaging the H-shaped shoe 26 between its legs, the arrangement being such, that the abutment arm 27 is swingable between two positions by movement of the shoe 26 in either direction by the operating rod 3. In one of these postions of the abutment arm 27 the free end thereof is in the path of the journal 23 and prevents the arm 20 from being swung in the clockwise direction as viewed in Fig. 3. In the other position the abutment arm 27 supports itself against the portion 19 of the operating rod 3 and permits the arm 20 to be swung in the said clockwise direction. The operating rod 3 is provided with an abutment flange 31 which at application of the brake, when the brake has travelled the distance corresponding to the normal value of the slack, abuts the casing 16 and at the continued brake application movement displaces the casing 16 together with the member 4 against the action of the spring 5. The end wall of the casing 16 is provided with an aperture 32 for the ledge 11, and the brake rod 2 is provided with a projection 33 for closing this aperture in the normal position of the member 4.

The operation of the now described mechanism according to Figs. 3 and 4 is as follows. The parts are shown in the position corresponding to released brake. Supposing that a stress arises in the brake rod, due for instance to a switching shock or the like, the abutment arm 27 permits the arm 20 to turn about its shaft 21 in the clockwise direction as viewed in Fig. 3. This means that the latch 12 does not lock the casing 16 and the member 4 to the brake rod 2 but permits movement of the member 4 on the brake rod 2 against the action of the spring 5, in spite of the roller 13 being engaged with the abutment 11a. This freedom of movement of the member 4 in relation to the brake rod 2 enables the slack adjuster to lock itself against any slack increasing movement that otherwise might be caused by an arising stress in the brake rod. As soon as at a beginning application movement of the brake the operating rod 3 begins to move to the left, as viewed in Fig. 3 in relation to the brake rod 2, the spring pressed shoe 26, due to its frictional contact with the brake rod portion 19, will partake in this movement of the operating rod 3, and the abutment arm 27, due to the engagement of its pins 30 with the shoe 26, will be swung in the clockwise direction, as viewed in Fig. 3, into the position in which it coacts with the journal 23 for preventing the arm 20 from being swung to the right about the shaft 21. As a result thereof the latch 12 during application movement of the brake, until the roller 14 reaches and can enter the recess 10 in the operating rod portion 19, acts to lock the casing 16 and the member 4 to the brake rod 2. In the moment the roller 14 enters the recess 10 for locking the member 4 to the operating rod 3, the flange 31 abuts the casing 16, and at the continued brake application movement the operating rod 3 displaces the casing 16 and the member 4 in relation to the brake rod 2 against the action of the spring 5. As soon as the brake is moved in the release direction the operating rod 3 is moved to the right, as viewed in Fig. 3, in relation to the brake rod 2, whereby the shoe 26 is also moved to the right and swings the abutment arm 27 into the position shown in Fig. 3. Thus, the abutment arm 27 is swung into this last mentioned position at the beginning of any release movement of the brake and remains in this position during the whole release movement and until it is again swung into the other position at the beginning of a new brake application movement. Consequently, at released brake, irrespective of the position in which the release movement might have been stopped, the member 4 is always free to be moved against the action of the spring 5 for enabling the slack adjuster to lock itself against such slack increasing movement as otherwise might take place under the action of switching shocks and the like.

What I claim and desire to secure by Letters Patent is:

1. In an operating mechanism for double-acting automatic brake slack adjusters of the type comprising a brake rod and a member slidable axially in both directions on said brake rod, a member for operating said slidable member by relative movement of said operating member and said brake rod in one direction at application and in the other direction at release of the brake, and a member mounted on said slidable member and movable under the control of the relative movement between said operating member and said brake rod into either of two positions, for locking said slidable member to either said brake rod or said operating member.

2. An operating mechanism as claimed in claim 1, in which said locking member is in the form of a latch swingably mounted on said axially slidable member and adapted to be held by said operating member in locking engagement with said brake rod until at application of the brake the latter has travelled a distance corresponding to a normal value of the brake slack.

3. An operating mechanism as claimed in claim 1, in which guiding means are provided on said operating member and said brake rod for moving and holding said locking member in locking engagement with said brake rod at application of the brake until the latter has travelled a distance corresponding to a normal value of the brake slack, and in locking engagement with said operating member at movement of the brake beyond said distance.

4. In an operating mechanism for double-acting automatic brake slack adjusters of the type comprising a brake rod and a member slidable axially in both directions on said brake rod, a member for operating said axially slidable member by relative movement of said operating member and said brake rod in one direction at application and in the other direction at release of the brake, a latch movable into either of two positions for engagement with said brake rod and said operating member, respectively, guiding means on said operating member and said brake rod for moving and holding said latch in the first of said positions at application of the brake until the latter has travelled a distance corresponding to a normal value of the brake slack, and in the other of said positions at movement of the brake beyond said distance, a member carrying said latch and movably mounted on said axially slidable member so as to permit axial movement of said latch along with said brake rod in relation to said axially slidable member upon occurrence of switching shocks an abutment mounted on said axially slidable member and shiftable in and out of an active position for preventing, when in active position, axial movement of said axially slidable member on said brake rod in relation to said latch, and means operable by a beginning relative movement of said operating member and said brake rod in the brake application direction and in the brake release direction for shifting said abutment into and out of said active position, respectively.

BERT HENRY BROWALL.